United States Patent
Chaudhri et al.

(10) Patent No.: US 8,839,142 B2
(45) Date of Patent: Sep. 16, 2014

(54) DESKTOP SYSTEM OBJECT REMOVAL

(75) Inventors: Imran A. Chaudhri, San Francisco, CA (US); John O. Louch, San Luis Obispo, CA (US)

(73) Assignee: Apple Inc., Cupertino, CA (US)

( * ) Notice: Subject to any disclaimer, the term of this patent is extended or adjusted under 35 U.S.C. 154(b) by 1192 days.

(21) Appl. No.: 11/760,565

(22) Filed: Jun. 8, 2007

(65) Prior Publication Data

US 2008/0307352 A1  Dec. 11, 2008

(51) Int. Cl.
*G06F 3/048* (2013.01)

(52) U.S. Cl.
USPC .................. 715/790; 715/797; 715/788

(58) Field of Classification Search
USPC .................................... 715/790, 788, 797
See application file for complete search history.

(56) References Cited

U.S. PATENT DOCUMENTS

| | | | |
|---|---|---|---|
| 4,555,755 A | 11/1985 | Pike | |
| 4,890,098 A | 12/1989 | Dawes et al. | |
| 5,191,620 A | 3/1993 | Lee | |
| 5,233,687 A | 8/1993 | Henderson et al. | |
| 5,265,202 A | 11/1993 | Krueger et al. | |
| 5,333,272 A | 7/1994 | Capek et al. | |
| 5,363,475 A | 11/1994 | Baker et al. | |
| 5,425,141 A | 6/1995 | Gedye | |
| 5,461,710 A | 10/1995 | Bloomfield et al. | |
| 5,463,728 A | 10/1995 | Blahut et al. | |
| 5,483,261 A | 1/1996 | Yasutake | |
| 5,487,143 A | 1/1996 | Southgate | |
| 5,488,204 A | 1/1996 | Mead et al. | |
| 5,513,303 A | 4/1996 | Robertson et al. | |
| 5,533,183 A | 7/1996 | Henderson et al. | |
| 5,565,657 A | 10/1996 | Merz | |
| 5,577,188 A | 11/1996 | Zhu | |
| 5,588,105 A | 12/1996 | Foster et al. | |
| 5,590,265 A | 12/1996 | Nakazawa | |
| 5,594,467 A | 1/1997 | Marlton | |
| 5,638,501 A | 6/1997 | Gough et al. | |
| 5,651,107 A | 7/1997 | Frank et al. | |
| 5,657,221 A | 8/1997 | Warman et al. | |
| 5,678,015 A | 10/1997 | Goh | |
| 5,694,150 A | 12/1997 | Tannenbaum | |
| 5,737,507 A | 4/1998 | Smith | |
| 5,754,174 A | 5/1998 | Carpenter et al. | |

(Continued)

FOREIGN PATENT DOCUMENTS

| | | |
|---|---|---|
| EP | 0 697 691 A2 | 2/1996 |
| EP | 0 961 200 A2 | 12/1999 |

(Continued)

OTHER PUBLICATIONS

Three-Dimensional Desktop-Google Search [on-line], [retrieved Nov. 9, 2006]. Retrieved from the Internet URL: http://www.google.com/search?sourceid=navclient&ie=U...LJ:2006-42,GGLJ:en&q=%22three+dimensional+desktop%22.

(Continued)

*Primary Examiner* — Andrea Leggett
(74) *Attorney, Agent, or Firm* — Morrison & Foerster LLP

(57) ABSTRACT

A graphical user interface includes a first system object, e.g., a window. The first system object is removed from the graphical user interface when the first system object remains inactive for a period of time, and the first system object is substantially overlapped by a second system object, e.g., a second window.

20 Claims, 13 Drawing Sheets

(56) References Cited

U.S. PATENT DOCUMENTS

| | | |
|---|---|---|
| 5,764,229 A | 6/1998 | Bennett |
| 5,767,855 A | 6/1998 | Bardon et al. |
| 5,798,752 A | 8/1998 | Buxton et al. |
| 5,822,123 A | 10/1998 | Davis et al. |
| 5,825,352 A | 10/1998 | Bisset et al. |
| 5,831,615 A | 11/1998 | Drews et al. |
| 5,835,079 A | 11/1998 | Shieh |
| 5,838,318 A | 11/1998 | Porter et al. |
| 5,841,435 A | 11/1998 | Dauerer et al. |
| 5,859,639 A | 1/1999 | Ebrahim |
| 5,880,411 A | 3/1999 | Gillespie et al. |
| 5,880,733 A | 3/1999 | Horvitz et al. |
| 5,892,511 A | 4/1999 | Gelsinger et al. |
| 5,903,271 A | 5/1999 | Bardon et al. |
| 5,920,315 A | 7/1999 | Santos-Gomez |
| 5,923,324 A | 7/1999 | Berry et al. |
| 5,929,854 A | 7/1999 | Ross |
| 5,936,610 A | 8/1999 | Endo |
| 5,940,517 A | 8/1999 | Shinada et al. |
| 5,973,665 A | 10/1999 | Davie et al. |
| 5,986,639 A | 11/1999 | Ozawa |
| 5,999,191 A | 12/1999 | Frank et al. |
| 6,008,809 A | 12/1999 | Brooks |
| 6,016,145 A | 1/2000 | Horvitz et al. |
| 6,031,529 A | 2/2000 | Migos et al. |
| 6,057,835 A | 5/2000 | Sato et al. |
| 6,061,064 A | 5/2000 | Reichlen |
| 6,072,489 A | 6/2000 | Gough et al. |
| 6,081,271 A | 6/2000 | Bardon et al. |
| 6,088,018 A | 7/2000 | Deleeuw et al. |
| 6,094,196 A | 7/2000 | Berry et al. |
| 6,118,427 A | 9/2000 | Buxton et al. |
| 6,147,684 A | 11/2000 | Nielsen et al. |
| 6,151,030 A | 11/2000 | Deleeuw et al. |
| 6,163,318 A | 12/2000 | Fukuda et al. |
| 6,188,391 B1 | 2/2001 | Seely et al. |
| 6,222,538 B1 | 4/2001 | Anderson |
| 6,246,407 B1 | 6/2001 | Wilks et al. |
| 6,249,826 B1 | 6/2001 | Parry et al. |
| 6,252,595 B1 | 6/2001 | Birmingham et al. |
| 6,292,204 B1 | 9/2001 | Carleton et al. |
| 6,307,545 B1 | 10/2001 | Conrad et al. |
| 6,310,610 B1 | 10/2001 | Beaton et al. |
| 6,323,846 B1 | 11/2001 | Westerman et al. |
| 6,336,131 B1 | 1/2002 | Wolfe |
| 6,342,908 B1 | 1/2002 | Bates et al. |
| 6,353,450 B1 | 3/2002 | Deleeuw |
| 6,359,631 B2 | 3/2002 | Deleeuw |
| 6,374,277 B2 | 4/2002 | Vong et al. |
| 6,409,603 B1 | 6/2002 | Nishino et al. |
| 6,414,677 B1 | 7/2002 | Robertson et al. |
| 6,429,883 B1 | 8/2002 | Plow et al. |
| 6,433,798 B1 | 8/2002 | Smith et al. |
| 6,509,911 B1 | 1/2003 | Shimotono |
| 6,515,688 B1 | 2/2003 | Berry et al. |
| 6,549,218 B1 | 4/2003 | Gershony et al. |
| 6,577,350 B1 | 6/2003 | Proehl et al. |
| 6,587,128 B2 | 7/2003 | Kanevsky et al. |
| 6,600,500 B1 * | 7/2003 | Yamamoto .................... 715/795 |
| 6,654,036 B1 | 11/2003 | Jones |
| 6,661,426 B1 | 12/2003 | Jetha et al. |
| 6,670,970 B1 | 12/2003 | Bonura et al. |
| 6,678,866 B1 | 1/2004 | Sugimoto et al. |
| 6,690,387 B2 | 2/2004 | Zimmerman et al. |
| 6,694,486 B2 | 2/2004 | Frank et al. |
| 6,720,982 B1 | 4/2004 | Sakaguchi |
| 6,734,884 B1 | 5/2004 | Berry et al. |
| 6,765,567 B1 | 7/2004 | Roberson et al. |
| 6,828,989 B2 | 12/2004 | Cortright |
| 6,874,126 B1 | 3/2005 | Lapidous |
| 6,876,369 B2 | 4/2005 | Brown et al. |
| 6,907,447 B1 | 6/2005 | Cooperman et al. |
| 6,996,783 B2 | 2/2006 | Brown et al. |
| 7,015,894 B2 | 3/2006 | Morohoshi |
| 7,043,701 B2 | 5/2006 | Gordon |
| 7,046,254 B2 | 5/2006 | Brown et al. |
| 7,068,266 B1 | 6/2006 | Ruelle |
| 7,119,819 B1 | 10/2006 | Robertson et al. |
| 7,138,983 B2 | 11/2006 | Wakai et al. |
| 7,155,729 B1 | 12/2006 | Andrew et al. |
| 7,184,064 B2 | 2/2007 | Zimmerman et al. |
| 7,249,326 B2 | 7/2007 | Steakley et al. |
| 7,249,327 B2 | 7/2007 | Nelson et al. |
| 7,260,610 B2 | 8/2007 | Grooters et al. |
| 7,286,141 B2 | 10/2007 | Rieffel et al. |
| 7,287,063 B2 | 10/2007 | Baldwin et al. |
| 7,305,441 B2 | 12/2007 | Mathewson et al. |
| 7,342,594 B1 | 3/2008 | Ort et al. |
| 7,350,154 B2 | 3/2008 | Anderson et al. |
| 7,386,801 B1 | 6/2008 | Horvitz et al. |
| 7,406,500 B2 | 7/2008 | Bantz et al. |
| 7,417,650 B1 | 8/2008 | Horvitz |
| 7,451,406 B2 | 11/2008 | Yoon |
| 7,512,902 B2 | 3/2009 | Robertson et al. |
| 7,594,185 B2 | 9/2009 | Anderson et al. |
| 7,663,607 B2 | 2/2010 | Hotelling et al. |
| 7,665,033 B2 | 2/2010 | Byrne et al. |
| RE41,922 E | 11/2010 | Gough et al. |
| 7,904,828 B2 | 3/2011 | Conrad et al. |
| 8,214,768 B2 | 7/2012 | Boule et al. |
| RE44,241 E | 5/2013 | Gough et al. |
| 8,473,859 B2 | 6/2013 | Chaudhri et al. |
| 8,479,122 B2 | 7/2013 | Hotelling et al. |
| 8,516,391 B2 | 8/2013 | Danton et al. |
| 2001/0004746 A1 | 6/2001 | Wright |
| 2001/0028368 A1 | 10/2001 | Swartz et al. |
| 2001/0040584 A1 | 11/2001 | Deleeuw |
| 2002/0042819 A1 | 4/2002 | Reichert et al. |
| 2002/0047859 A1 | 4/2002 | Szlam et al. |
| 2002/0094868 A1 | 7/2002 | Tuck et al. |
| 2002/0140746 A1 | 10/2002 | Gargi |
| 2002/0143630 A1 | 10/2002 | Steinman et al. |
| 2002/0167546 A1 | 11/2002 | Kimbell et al. |
| 2002/0191028 A1 | 12/2002 | Senechalle et al. |
| 2003/0001899 A1 | 1/2003 | Partanen et al. |
| 2003/0016253 A1 | 1/2003 | Aoki et al. |
| 2003/0043197 A1 | 3/2003 | Kremer et al. |
| 2003/0051228 A1 | 3/2003 | Martinez et al. |
| 2003/0145060 A1 | 7/2003 | Martin |
| 2003/0179234 A1 | 9/2003 | Nelson et al. |
| 2003/0179237 A1 | 9/2003 | Nelson et al. |
| 2003/0229722 A1 | 12/2003 | Beyda |
| 2004/0001101 A1 | 1/2004 | Trajkovic |
| 2004/0098462 A1 | 5/2004 | Horvitz et al. |
| 2004/0165010 A1 | 8/2004 | Robertson et al. |
| 2004/0204886 A1 | 10/2004 | Rieqer et al. |
| 2005/0010876 A1 * | 1/2005 | Robertson et al. ............. 715/782 |
| 2005/0066292 A1 | 3/2005 | Harrington |
| 2005/0235210 A1 | 10/2005 | Peskin et al. |
| 2005/0240880 A1 | 10/2005 | Banks et al. |
| 2005/0257159 A1 * | 11/2005 | Keohane et al. ............... 715/752 |
| 2005/0283742 A1 | 12/2005 | Gusmorino et al. |
| 2006/0026521 A1 | 2/2006 | Hotelling et al. |
| 2006/0161861 A1 | 7/2006 | Holecek et al. |
| 2006/0197753 A1 | 9/2006 | Hotelling |
| 2006/0224991 A1 | 10/2006 | Stabb et al. |
| 2007/0061745 A1 | 3/2007 | Anthony et al. |
| 2007/0174777 A1 | 7/2007 | Finley et al. |
| 2007/0192727 A1 | 8/2007 | Finley et al. |
| 2010/0138767 A1 | 6/2010 | Wang et al. |
| 2011/0078624 A1 | 3/2011 | Missig et al. |
| 2012/0096392 A1 | 4/2012 | Ording et al. |
| 2012/0096395 A1 | 4/2012 | Ording et al. |
| 2012/0096396 A1 | 4/2012 | Ording et al. |
| 2012/0096397 A1 | 4/2012 | Ording et al. |
| 2012/0246596 A1 | 9/2012 | Ording |

FOREIGN PATENT DOCUMENTS

| | | |
|---|---|---|
| EP | 1022650 | 7/2000 |
| EP | 1 033 649 A2 | 9/2000 |
| JP | 2000-152112 | 5/2000 |
| JP | 2000-163031 A | 6/2000 |
| JP | 2002-342033 A | 11/2002 |

(56) References Cited

FOREIGN PATENT DOCUMENTS

| WO | WO-01/69387 | 9/2001 |
|---|---|---|
| WO | WO-2012/054620 A1 | 4/2012 |
| WO | WO-2012/054628 A2 | 4/2012 |
| WO | WO-2012/115964 A2 | 8/2012 |

OTHER PUBLICATIONS

3DNA Desktop [on-line], [retrieved Nov. 9, 2006]. Retrieved from the Internet URL: http://www.3dna.net/products/desktop.htm.
Metisse-Screenshots [on-line], [retrieved Nov. 9, 2006]. Retrieved from the Internet URL: http://insitu.lri.fr/~chapuis/metisse/screenshots.
Spatial Research [on-line], [retrieved Nov. 9, 2006]. Retrieved from the Internet URL: http://www.spatialresearch.com/spaces.
The TaskGallery [on-line], [retrieved Nov. 9, 2006]. Retrieved from the Internet URL: http://research.microsoft.com/ui/TaskGaller.
Rotate Window, Java Technology Powers Vodafone Mobile Games Worldwide. Copyright 1994-2006 Sun Microsystems, Inc. [on-line], [retrieved Nov. 9, 2006]. Retrieved from the Internet URL: http://www.sun/com/jsp_utils?ScreenShotPopup.jsp?title=R..ss/&ism=md_1.jpg&alt=Generic%20Screen%20Shot%20Alt%20Text.
Switch Desktops, Copyright 1994-2006 Sun Microsystems, Inc. [on-line], [retrieved Nov. 9, 2006]. Retrieved from the internet URL: http://www.sun.com/jsp_utils/ScreenShotPopup.jsp?title=Sw.../&im=pan-r_3.jpg&alt-Generic%20Screen%20Shot%20Alt%20Text11/9/2006.
Stanford Panorama, Copyright 1994-2006 Sun Microsystems, Inc. [on-line], [retrieved Nov. 9, 2006]. Retrieved from the internet URL: http://www.sun.com/jsp_utils/ScreenShotPopup.jsp?title=St.../&im=pan_2.jpg&alt=Generic%20Screen%20Shot%20Alt%20Text11/9/2006.
Java Solaris Communities Partners My Sun Sun [on-line], [retrieved Nov. 9, 2006]. Retrieved from the internet URL: http://www.sun.com/software/looking-glass/details.xml.
3D Desktop Project by Sun MicroSystems: A Revolutionary Evolution of Today's Desktop [on-line]. [Retrieved Nov. 9, 2006]. Retrieved from the internet URL: http://www.lg3d.dev.java.net.
Agarawala A. and Balakrishnan R. (2006). "Keepin' It Real: Pushing the Desktop Metaphor with Physics, Piles and the Pen". [on-line], [retrieved May 14, 2008]. Retrieved from the internet URL: http://bumptop.com/Bump.Top. Montreal, Quebec, Canada.
BumpTop 3D Desktop Prototype—www.bumptop.com. (2008), [on-line], [retrieved May 14, 2008], Retrieved from the internet URL: http://www.youtube.com/watch?v=M0ODskdEPnQ.
Final Office Action mailed Aug. 28, 2012, for U.S. Appl. No. 11/635,833, filed Dec. 8, 2006, eight pages.
Final Office Action mailed Jan. 26, 2010, for U.S. Appl. No. 11/635,833, filed Dec. 8, 2006, eleven pages.
Final Office Action mailed Jun. 8, 2010, for U.S. Appl. No. 11/635,833, filed Dec. 8, 2006, twelve pages.
Final Office Action mailed Mar. 18, 2011, for U.S. Appl. No. 11/635,833, filed Dec. 8, 2006, eleven pages.
Final Office Action mailed Mar. 7, 2013, for U.S. Appl. No. 11/635,833, filed Dec. 8, 2006, five pages.
Non-Final Office Action mailed Aug. 25, 2009, for U.S. Appl. No. 11/635,833, filed Dec. 8, 2006, eleven pages.
Non-Final Office Action mailed Oct. 13, 2010, for U.S. Appl. No. 11/635,833, filed Dec. 8, 2006, ten pages.
Non-Final Office Action mailed Dec. 8, 2011, for U.S. Appl. No. 11/635,847, filed Dec. 8, 2006, nine pages.
Non-Final Office Action mailed Feb. 6, 2012, for U.S. Appl. No. 11/635,833, filed Dec. 8, 2006, seven pages.
Non-Final Office Action mailed Nov. 6, 2012, for U.S. Appl. No. 11/635,833, filed Dec. 8, 2006, ten pages.
Notice of Allowance mailed May 3, 2013, for U.S. Appl. No. 11/635,833, filed Dec. 8, 2006, six pages.
Notice of Allowance mailed Jul. 24, 2013, for U.S. Appl. No. 11/635,847, filed Dec. 8, 2006, eight pages.
Anonymous. (Nov. 16, 2010). Exposé(Mac OS X), located at http//:en.wikipedia.org/w/index.php?title=Exposé(Mac_OS_X_&ol . . ., last visited on May 3, 2011, four pages.
Anonymous. (Oct. 23, 2003). "Expose," Apple Inc. located at http://www/apple.com/macosx/what-is-macosx/expose.html, last visited May 3, 2011.
Apple Inc vs. Samsung Electronic, (Oct. 7, 2011). "Samsung's Patent Local Rule 3-3 And 3-4 Disclosures", Case No. 11-cv-01846-LHK, 62 pages.
ATI Technologies Inc. (2000). "Multimedia Center 7.1 User Guide, Version 6.0", 96 pages.
Bier, E. et al. (1993). "Toolglass and Magic Lenses: The See-Through Interface", Xero PARC, Palo Alto, CA, eight pages.
Buckner, R. (1992). "Multiple Windows and Task Complexity Effects Upon Human-Computer Interface Viewability and Productivity," U.M.I., Ann Arbor, MI, 315 pages.
European Search Report mailed Feb. 21, 2012, for EP Application No. 11185625.8, eight pages.
European Search Report mailed Jan. 30, 2012, for EP Application No. 11185624.1, eight pages.
Faas, R. (Nov. 21, 2006). "Spaces: A Look at Apple's Take on Virtual Desktops in Leopard," located at www.computerworld.com, last visited Jan. 17, 2012.
Final Office Action mailed Jun. 7, 2013, for U.S. Appl. No. 12/907,981, filed Oct. 19, 2010, 17 pages.
Final Office Action mailed Jun. 10, 2013, for U.S. Appl. No. 12/907,986, filed Oct. 19, 2010, 13 pages.
Final Office Action mailed Jun. 18, 2013, for U.S. Appl. No. 12/907,982 filed Oct. 19. 2010, 15 pages.
Final Office Action mailed Jun. 21, 2013, for U.S. Appl. No. 12/907,983, filed Oct. 19. 2010, 14 pages.
Final Office Action mailed Sep. 12, 2013, for U.S. Appl. No. 13/399,987, filed Feb. 17, 2012, 10 pages.
Henderson, D.A. et al. (Jul. 1986). "Rooms: The Use of Multiple Virtual Workspaces to Reduce Space Contention in an Window-based Graphical User Interface," *ACM Transactions of Graphics* 5(3):211-243.
International Search Report and Written Opinion mailed Feb. 2, 2012, for PCT Application No. PCT/US2011/056908, 13 pages.
International Search Report and Written Opinion mailed Feb. 17, 2012, for PCT Application No. PCT/US2011/056918, 14 pages.
International Search Report mailed Mar. 18, 2013, for PCT Application No. PCT/US2012/025941, filed Feb. 21, 2012, six pages.
Kamba, T. et al. (1996). "Using Small Screen Space More Efficiently," ACM, Vancouver, BC Canada, eight pages.
Kurtenbach, G. et al. (Mar. 1997). "The Design of a GUI Paradigm based on Tablets, Two-Hands, and Transparency," Toronto, Canada, eight pages.
Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.
Lieberman, H. (Nov. 1994). "Powers of Ten Thousand: Navigating in Large Information Spaces,"Media Laboratory, Massachusetts Institue of Technology, three pages.
Miah, T. (Jan. 17, 2000). "Vanishing Windows—A Technique for Adaptive Window Management," LUTCHI Research Centre, Loughborough University, 19 pages.
Micron Electronics Inc. (Jan. 20, 2000). "TransPort LT User's Guide," 170 pages.
Non-Final Office Action mailed Oct. 9, 2012, for U.S. Appl. No. 12/907,981, filed Oct. 19, 2010, 21 pages.
Non-Final Office Action mailed Oct. 10, 2012, for U.S. Appl. No. 12/907,983, filed Oct. 19, 2010, 16 pages.
Non-Final Office Action mailed Oct. 15, 2012, for U.S. Appl. No. 12/907,986, filed Oct. 19, 2010, 16 pages.
Non-Final Office Action mailed Oct. 16, 2012, for U.S. Appl. No. 12/907,982, filed Oct. 19, 2010, 20 pages.
Non-Final Office Action mailed Apr. 11, 2013, for U.S. Appl. No. 13/399,987, filed Feb. 17, 2012, eight pages.
Non-Final Office Action mailed Oct. 25, 2013, for U.S. Appl. No. 12/907,986, filed Oct. 19, 2010, 10 pages.
Non-Final Office Action mailed Nov. 6, 2013, for U.S. Appl. No. 12/907,981, filed Oct. 19, 2010, 15 pages.

(56) References Cited

OTHER PUBLICATIONS

Non-Final Office Action mailed Nov. 7, 2013, for U.S. Appl. No. 12/907,983 filed Oct. 19. 2010, 12 pages.
Non-Final Office Action mailed Mar. 4, 2014, for U.S. Appl. No. 12/907,986, filed Oct. 19, 2010, 11 pages.
Norman, K. et al. (May 20, 1986). "Cognitive Layouts of Windows and Multiple Screens for User Interfaces," University of Maryland, USA, 20 pages.
Pogue, D. (Dec. 2009). "Documents, Programs, and Spaces," Chapter 4 in *Switching to the Mac: The Missing Manual, Snow Leopard Edition,* First Edition, *O'Reilly Media Inc.,* pp. 129-134.
Raggi, E. et al. (2010). "Booting Ubuntu for the First Time," Chapter 6 in *Beginning Ubuntu Linux,* 5th Edition, *Apress* pp. 90-92.
Raphael, J.R. (May 7, 2010). "Android 101: A Guide to Using Your Android Phone," PC World, located at http://www.pcworld.idg.com.au/article/345700/android_101_guide_using_your_android_phone/, last visited Sep. 30, 2012, two pages.
Robertson, G. et al. (Apr. 2000). "The Task Gallery: A 3D Window Manager," *CHI 2000 Conference Proceedings: Conference on Human Factors in Computing Systems,* The Hague, Netherlands, Apr. 1-5, 2000, pp. 494-501.
Robertson, G. et al. (Nov. 1998). "Data Mounta697in: Using Spatial Memory for Document Management," Proceedings of the 11th Annual ACM Symposium on User Interface Software and Technology (UIST '98), pp. 153-162.
Rosenzweig, G. (Jul. 2010). "My iPad," Safari Books Online located at http://proquest.safaribooksonline.com/book/hardware-and-gadgets/9780132378413, last visited on Jan. 19, 2012.
Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.
Rubine, D.H. (May 1992). "Combining Gestures and Direct Manipulation," CHI '92, pp. 659-660.
Samsung, "Additional Prior Art Relevant To The Invalidity Of The '891 Patent Exhibit N", U.S. Patent No. 7,853,891, three pages.
Samsung, "Samsung's Invalidity Claim Chart For Bongwon Suh et ai.,Popout Prism: Adding Perceptual Principles To Overview+ Detail Document Interfaces, Proceedings Of The Sigchi Conference On Human Factors in Computing Systems, Association For Computing Machinery", Exhibit M-8, U.S. Patent No. 7,853,891, 19 pages.
Samsung, "Samsung's Invalidity Claim Charts For ATI Multimedia Center 7.1 ("ATI") Exhibit M-10", U.S. Patent No. 7,853,891, 16 pages.
Samsung, "Samsung's Invalidity Claim Charts For Crusader: No Remorse And Crusader: No Regret ("Crusader") Exhibit M-11", U.S. Patent No. 7,853,891, 17 pages.
Samsung, "Samsung's Invalidity Claim Charts for EP 1 022 650 Exhibit M-6", U.S. Patent No. 7,853,891, 15 pages.
Samsung, "Samsung's Invalidity Claim Charts For Grand Theft Auto III ("GTA3") Exhibit M12", U.S. Patent No. 7,853,891, 23 pages.
Samsung, "Samsung's Invalidity Claim Charts For Micron Computers, Including Micron Transport Lt, Commercially Sold, Publicly Known, Or Publicly Used Before Jul. 10, 2002 ("Micron Computers") Exhibit M-13", U.S. Patent No. 7,853,891, 13 pages.
Samsung, "Samsung's Invalidity Claim Charts For Micron Transport Lt User's Guide ("Micron") Exhibit M-9", U.S. Patent No. 7,853,891, 16 pages.
Samsung, "Samsung's Invalidity Claim Charts For Sony Computer Displays, Including Sony Trinitron, And Computers With Sony Computer Displays Commercially Sold, Publicly Known, Or Publicly Used Before Jul. 10,2002 ("SonyTrinitron") Exhibit M-14", U.S. Patent No. 7,853,891, 19 pages.
Samsung, "Samsung's Invalidity Claim Charts for U.S Patent No. 6,907,447 Exhibit M-1", U.S. Patent No. 7,853,891, 16 pages.
Samsung, "Samsung's Invalidity Claim Charts for U.S Patent No. 7,155,729 Exhibit M-2", U.S. Patent No. 7,853,891, 13 pages.
Samsung, "Samsung's Invalidity Claim Charts for U.S Patent No. 7,249,326 Exhibit M-3", U.S. Patent No. 7,853,891, 13 pages.
Samsung, "Samsung's Invalidity Claim Charts for U.S Patent No. 7,417,650 Exhibit M-4", U.S. Patent No. 7,853,891, 12 pages.
Samsung, "Samsung's Invalidity Claim Charts for U.S. Publication No. 2002/0143630 Exhibit M-5", U.S. Patent No. 7,853,891, 15 pages.
Samsung, "Samsung's Invalidity Claim Charts For U.S. Patent Application No. 2003/0016253 ("Aoki")", And Cooperman '447, Andrew '729, Steakley '326, Horvitz '650, Steinman '630, Sakaguchi '650, Suh, Micron, ATI, Crusader, GTA3, Micron Computers, Sony Trinitron, Windows XP, And U.S. Patent Application No. 2003/0051228 ("Martinez") Exhibit 0-1, U.S. Patent No. 7,853,891, 25 pages.
Samsung, "Samsung's Invalidity Claim Charts For Windows XP and Computers With Windows XP Commercially Sold, Publicly Known, Or Publicly Used Before Jul. 10, 2002 ("Windows XP") Exhibit M-15", U.S. Patent No. 7,853,891, 13 pages.
Samsung, "Samsung's Invalidity Claim Charts For WO 01/69387 Exhibit M-7", U.S. Patent No. 7,853,891, 13 pages.
Suh, B. et al. (Apr. 2002). "Popout Prism: Adding Perceptual Principles to Overview+ Detail Document Interfaces," Minneapolis, Minnesota, 8 pages.
Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.
Zanella, A. et al. (2000). "Avoiding Interference Through Translucent Interface Components in Single Display Groupware", University of Calgary, Calgary, Canada, two pages.
Zhai, S. et al. (1996). "The Partial-Occlusion Effect: Utilizing Semitransparency in 3D Human-Computer Interaction," University of Toronto, 23 pages.
Non-Final Office Action mailed Apr. 10, 2014, for U.S. Appl. No. 13/399,987, filed Feb. 17, 2012, five pages.

\* cited by examiner

DESKTOP SYSTEM OBJECT REMOVAL

BACKGROUND

A graphical user interface allows a large number of graphical objects or items to be displayed on a display screen at the same time. Leading personal computer operating systems, such as Apple Mac OS®, provide user interfaces in which a number of visualizations of system objects, such as windows, system functions, alerts, visualization objects representative of files, peripherals, applications, and other representations of system objects can be displayed according to the needs of the user. Taskbars, menus, virtual buttons, a mouse, a keyboard, and other user interlace elements provide mechanisms for accessing and/or activating the system objects corresponding to the displayed representations.

The graphical representations of system objects and access to the corresponding system objects and related functions should be presented in a manner that facilitates an intuitive user experience with the graphical user interface. The use of a large number of graphical representations simultaneously on a graphical user interface, however, can detract from an intuitive user experience where the graphical user interlace becomes cluttered with too may graphical representations.

SUMMARY

Disclosed herein are methods, apparatus and system including a graphical user interface. In an implementation, the graphical user interface can include a window. The window can be automatically removed from the graphical user interface when the window remains inactive for a period of time, and the window is overlapped by a second window. In other implementations, a window displayed on a graphical user interface can be automatically removed from a graphical user interface when: the window remains inactive for a period of time and the window is substantially overlapped by a second window; the window remains inactive for a period of time and the window is overlapped by a number of windows exceeding a threshold number of windows; the window remains inactive for a period of time and a total number of windows displayed by the graphical user interface exceeds a threshold number of windows; a total number of windows displayed by the graphical user interface exceeds a threshold number of windows; and/or the window is overlapped by a number of windows exceeding a threshold number of windows. According to another implementation, the graphical user interface can include a three-dimensional graphical user interface having at least a first surface and a second surface, and a window may be removed from the first surface and placed on the second surface when the window remains inactive for a period of time and the window is substantially overlapped by a second window. Still other implementations exist.

One or more of the following features may also be included. The window can be removed from the graphical user interface by: being scaled down in size until it ceases to exist; by being moved laterally and/or vertically off of the graphical user interface; by gradually becoming transparent until it ceases to exist; by being deleted; and/or by being reduced in size. The period of time may be set by a user. The substantial overlap required before removal of the window can occur, for instance, when approximately 50%-75% or more of the window's area or window edge is overlapped by the second window. The window can be associated with and/ or can represent an application, a message, alert or notification, and/or a system object.

These general and specific aspects may be implemented using a system, a method, or a computer program, or any combination of systems, methods, and computer programs.

BRIEF DESCRIPTION OF THE DRAWINGS

Reference will now be made to the accompanying drawings, which are not necessarily drawn to scale, and wherein.

DETAILED DESCRIPTION

Figure 1:
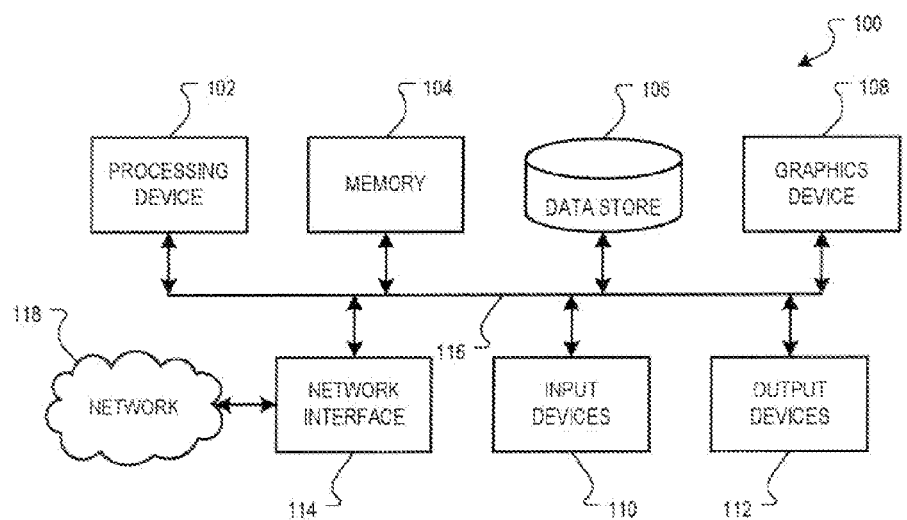
FIG. 1 is a block diagram of an example system that can be utilized to implement the systems and methods described herein.

FIG. 1 is a block diagram of an example system 100 that can be utilized to implement the systems and methods described herein. The system 100 can, for example, be implemented in a computer device, such any one of the personal computer devices available from Apple Computer, Inc., or other electronic devices. Other example implementations can also video processing devices, multimedia processing devices, portable computing devices, portable communication devices, set top boxes, personal digital assistants, etc.

The example system 100 includes a processing device 102, a first data store 104, a second data store 106, a graphics device 108, input devices 110, output devices 112, and a network device 114. A bus system 116, such as a data bus and a motherboard, can be used to establish and control data communication between the components 102, 104, 106, 108, 110, 112 and 114. Other example system architectures, however, can also be used.

The process device 102 can, for example, include one or more microprocessors. The first data store 104 can, for example, include a random access memory storage device, such as a dynamic random access memory, or other types of computer-readable medium memory devices. The second data store 106 can, for example, include one or more hard drives, a flash memory, and/or a read only memory, or other types of computer-readable medium memory devices.

The graphics device 108 can, for example, include a video card, a graphics accelerator card, or display adapter and is configured is to generate and output images to a display device. In one implementation, the graphics device 108 can be realized in a dedicated hardware card connected to the bus system 116. In another implementation, the graphics device 108 can be realized in a graphics controller integrated into a chipset of the bus system 116. Other implementations can also be used.

Example input devices 110 can include a keyboard, a mouse, a stylus, a video camera, a multi-touch surface, etc., and example output devices 112 can include a display device, an audio device, etc.

The network interface 114 can, for example, include a wired or wireless network device operable to communicate data to and from a network 118. The network 118 can includes one or more local are networks (LANs) or a wide area network (WAN), such as the Internet.

In an implementation, the system 100 includes instructions defining an operating system stored in the first data store 104 and/or the second data store 106. Example operating systems can include the MAC OS® X series operating system, the WINDOWS® based operating system, or other operating systems. Upon execution of the operating system instructions, access to various system objects is enabled. Example system objects include data files, applications, functions, windows, etc. To facilitate an intuitive user experience, the system 100 includes a graphical user interface that provides the user access to the various system objects and conveys information about the system 100 to the user in an intuitive manner.

Figure 2:
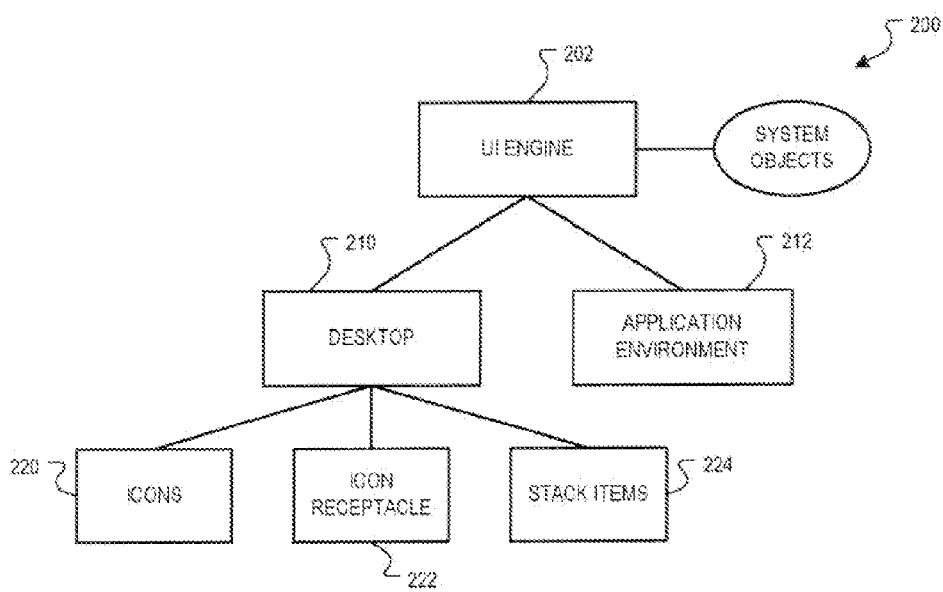
FIG. 2 is a block diagram of an example user interface architecture.

FIG. 2 is a block diagram of an example user interface architecture 200. The user interface architecture 200 includes a user interface (UI) engine 202 that provides the user access to the various system objects 204 and conveys information about the system 100 to the user.

Upon execution, the UI engine 202 can cause the graphics device 108 to generate a graphical user interface on an output device 112, such as a display device. In one implementation, the graphical user interface can include a two dimensional desktop environment.

In another implementation, the graphical user interface can include a multidimensional desktop 210 and a multidimensional application environment 212 including x-, y- and z-axis aspects, e.g., a height width and depth aspect. The x-, y- and z-axis aspects may define a three-dimensional environment e.g., a "3D" or "2.5D" environment that includes a z-axis, e.g., depth, aspect. In an implementation, the multidimensional application environment can include an application environment distributed along a depth aspect. For example, a content frame, e.g., an application window, can be presented on a first surface, and control elements, e.g., toolbar commands, can be presented on a second surface.

In an implementation, the desktop 210 can include visualization objects 220, and optionally, a visualization object receptacle 222 and/or stack items 224. An example implementation of a visualization object receptacle 300 is the "Dock" user interface in the MAC OS® X Leopard operating system. Other Implementations can also be used. In some implementations, the visualization objects 220, the visualization object receptacle 222, and the stack items 224 can be presented as two dimensional graphical objects or, in a pseudo-three dimensional (i.e., "2.5D") or a three dimensional environment, as graphical objects have a depth aspect.

A visualization object 220 can, for example, be a visual representation of a system object. In some implementations, the visualization objects 220 are icons. Other visualization objects can also be used, e.g., alert notification windows, menu command bars, windows, or other visual representations of system objects.

Figure 3:
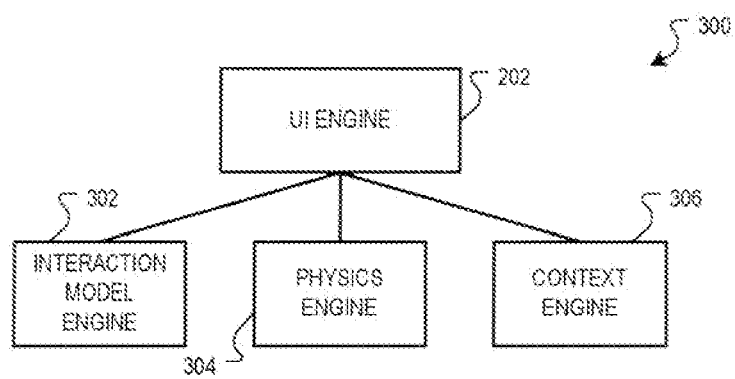
FIG. 3 is a block diagram of an example user interface engine architecture.

FIG. 3 is a block diagram of an example user interface engine architecture 300. The UI engine 202 can, for example, include an interaction and visualization model engine 302, a physics engine 304, and a context engine 306. Other engines can also be included.

In one implementation, the interaction and visualization, model engine 302 can identify association characteristics of associated visualization objects, e.g., icons. The associated graphical elements can be collectively displayed, e.g., in an object stack, or can be distributed in a desktop/folder hierarchy in which only one visualization object is displayed. Based on the identified characteristic, the interaction and visualization model engine 302 can automatically select an interaction model and/or visualization mode that defines how the user may interact with and view the associated graphical elements.

In one implementation, the physics engine 304 can apply a physics aspect, such as Newtonian physics models based on mass, velocity, etc., to the visual representations of system objects, such as windows. In an implementation, the windows can be modeled as rigid bodies or non-rigid bodies. For example, placing a window on a surface next to adjacent windows can cause the adjacent windows to shift positions in response to a simulated disturbance from the window placement. The physics engine 304 can also effect motion of system objects, including windows, to permit movement of the system objects and other graphical functions, such as scaling of a window, making a window become transparent, and the like.

The context engine 306 can, for example, provide contextual control of a system objects based on a context. For example, windows can be defined according to a window type, and each window type may be subject to different rules for display, movement, and removal. Other contextual control can also be provided, such as contextual control based on a temporal context, or an execution context, and the like.

Figure 4:
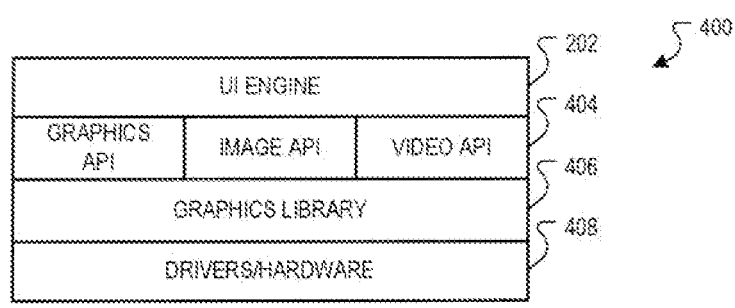
FIG. 4 is block diagram of example system layer structure that can be utilized to implement the systems and methods described herein.

FIG. 4 is block diagram of example system layers 400 that can be utilized to implement the systems and methods described herein. Other system layer implementations, however, can also be used.

In an implementation, a UI engine, such as the UI engine 202, operates an application level 402 and implements graphical functions and features available through an application program interface (API) layer 404. Example graphical functions and features include graphical processing, supported by a graphics API, image processing, support by an imaging API, and video processing, supported by a video API.

The API layer 404, in turn, interfaces with a graphics library layer 406. The graphics library layer 404 can, for example, be implemented as a software interface to graphics hardware, such as an implementation of the OpenGL specification. A driver/hardware layer 408 includes drivers and associated graphics hardware, such as a graphics card and associated drivers.

Figure 5:
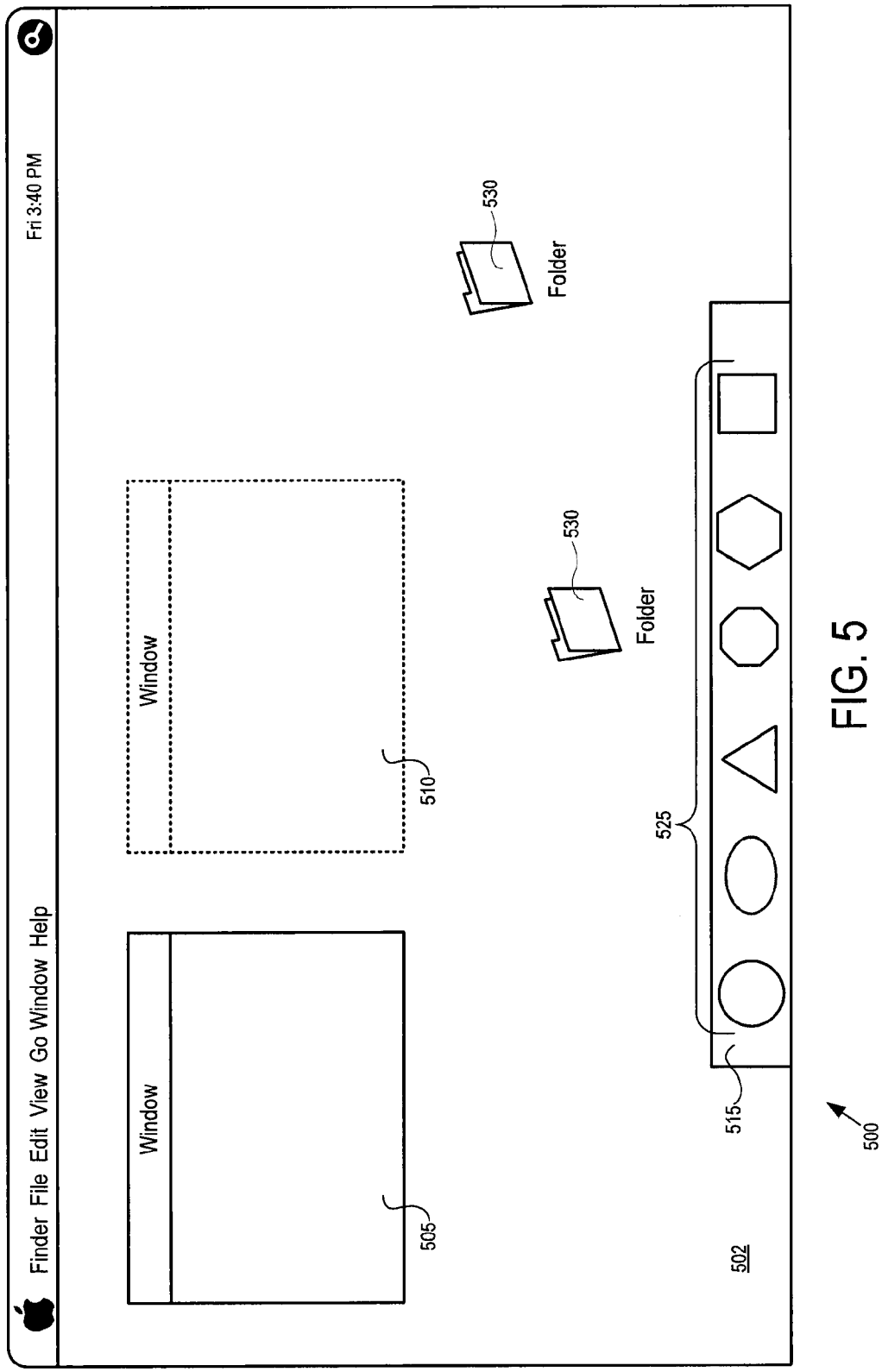
FIG. 5 is a block diagram of an example desktop environment.

FIG. 5 is a block diagram of an example desktop environment 500. In an implementation, the desktop environment 500 provides a two dimensional viewing surface 502. The viewing surface 502 can include a visualization object receptacle 515, e.g., and icon receptacle, having one or more visualization objects 525, e.g., icons. The visualization objects 525 can, for example, include graphical representations corresponding to one or more system objects, such as applications, documents, and functions. The viewing surface 502 can also include one or more system objects separate from the visualization object receptacle 515, such as folders 530, and windows 505, 510. Although only one visualization object receptacle is shown, addition icon receptacles can also be displayed.

According to an implementation, each window 505, 510 can represent an application, a message, alert or notification, and/or a system object. For instance, one or both windows 505, 510 can represent computer programs viewed and/or controlled by a user via the example desktop environment 500. According to another example, one or both windows 505, 510 can represent an alert or notification, such as a download status window, a message alert window, or the like.

The example desktop environment 500 of FIG. 5 shows a first window 505, and a second window 510. According to an implementation, the first window 505 can represent a currently selected or 'active' window, which may be the last system object the user selected. For instance, a user may cause a window to become active by selecting the window with a user input device, such as a mouse or keyboard. According to an implementation, when one window is active, all other windows displayed on the desktop environment are inactive, such as the second window 510. Although inactive windows can include all windows on an example desktop environment but for the active window, each may represent an active application, message, alert or notification, and/or other system object. For instance, the first window 505 in FIG. 5 may represent a word processing program a user is currently interacting with, and the second window 510 may represent a graphics software program that remains open and available to the user should the user choose to interact with it, such as by selecting the second window 510 using a mouse or keyboard.

The windows 505, 510 shown in FIG. 5 do not overlap. Therefore, none of the area defined by the border of the first window 505 covers any of the area defined by the border of the second window 510, and vice versa.

Figure 6:
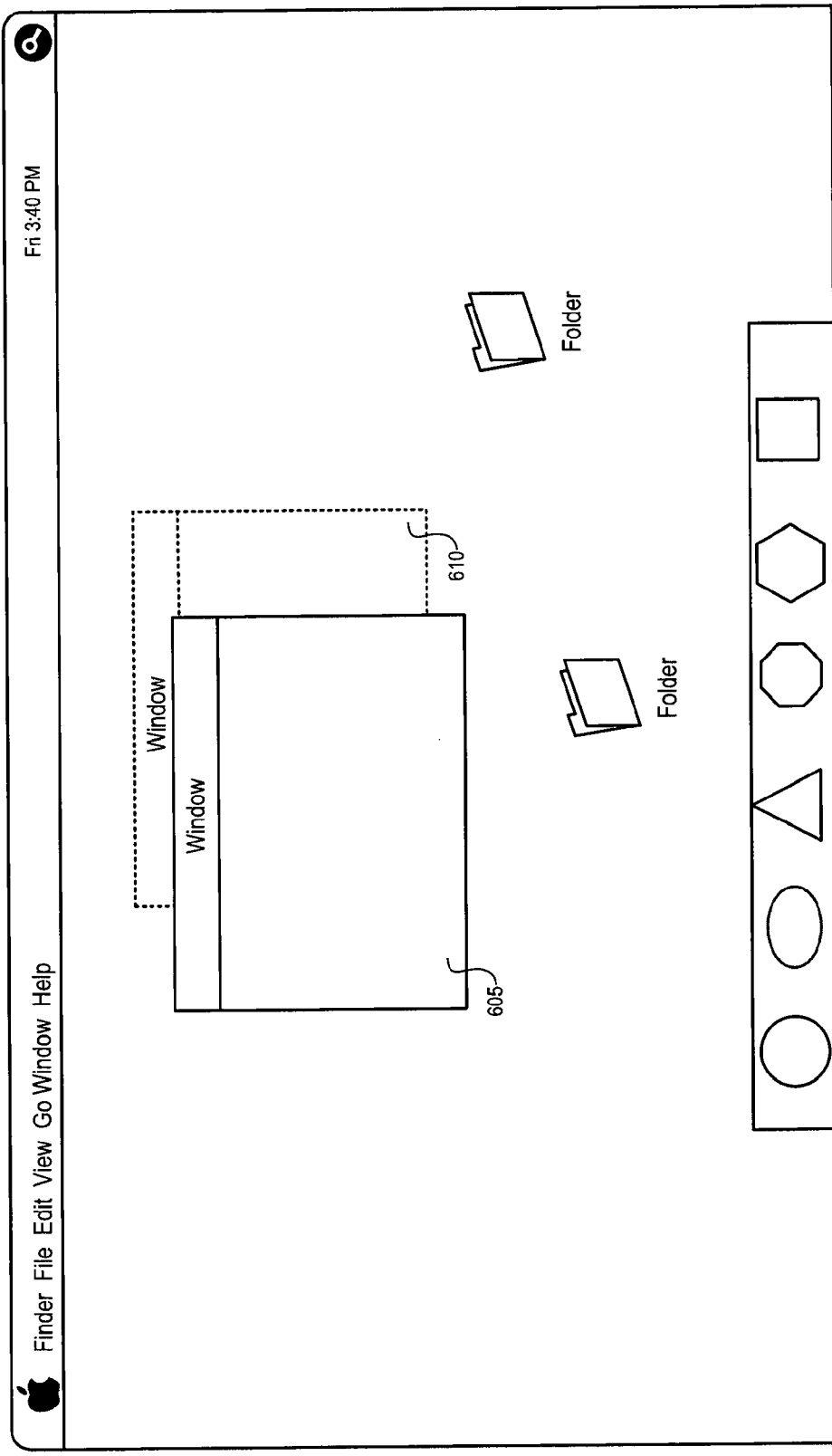
FIG. 6 is a block diagram of another example desktop environment.

FIG. 6 is a block diagram of another example desktop environment 600. In the desktop environment 600, a first window 605 overlaps a second, window 610. According to an implementation, if the user fails to select or use the second window 610, the second window 610 may be automatically removed from the desktop environment 600 when certain conditions are satisfied.

According to an implementation, the second window 610 may be automatically removed from the desktop environment if the idle windows remains in an idle state, i.e., unused, for a period of time. The period of time may be set by a user via one or more graphical user interfaces or may be permanently established by an operating system, or the like. A timer or counter may be initiated or assigned to each window in a desktop environment when it is no longer being used. Use may include interaction with the window by a user, or the active running of one or more processes by the software displayed by the window. When the timer for a particular window reaches the preset period of time, the window is removed from the desktop environment.

The removal of a window from a desktop environment, such as the second window 610 of FIG. 6, can occur regardless of the amount of overlap from one or more other windows, such as the first window 605. However, according to another implementation, a window may be automatically removed from the desktop environment if the window remains unused for a period of time and the window is overlapped by one or more other windows. The window may be required to be overlapped by one or more other windows for the entire length of the period of time, for only a portion of the period of time, or at the moment the period of time expires. For instance, the second window 610 may be removed from the desktop environment 600 after the second window 610 remains in an inactive state for a period of time while the second window 610 is overlapped by the first window 605.

According to one implementation, a window must be substantially overlapped by one or more other windows before it is removed from a desktop environment. A window may be substantially overlapped by one or more other windows, for instance, when greater than approximately 50% to 75% of the window's area is overlapped by the one or more other windows. For instance, in FIG. 6, because greater than 50% of the second window's 610 area is overlapped by the first window 605, the second window 610 will be removed from the desktop environment if the second window 610 remains inactive for a period of time. Other values of overlapping, such as 24%-50% or 75%-90%, may also constitute a substantial overlapping.

According to yet another implementation, a window that is substantially overlapped by one or more other windows may be removed from a desktop environment regardless of the amount of time the window has remained in an inactive state.

Figure 7:
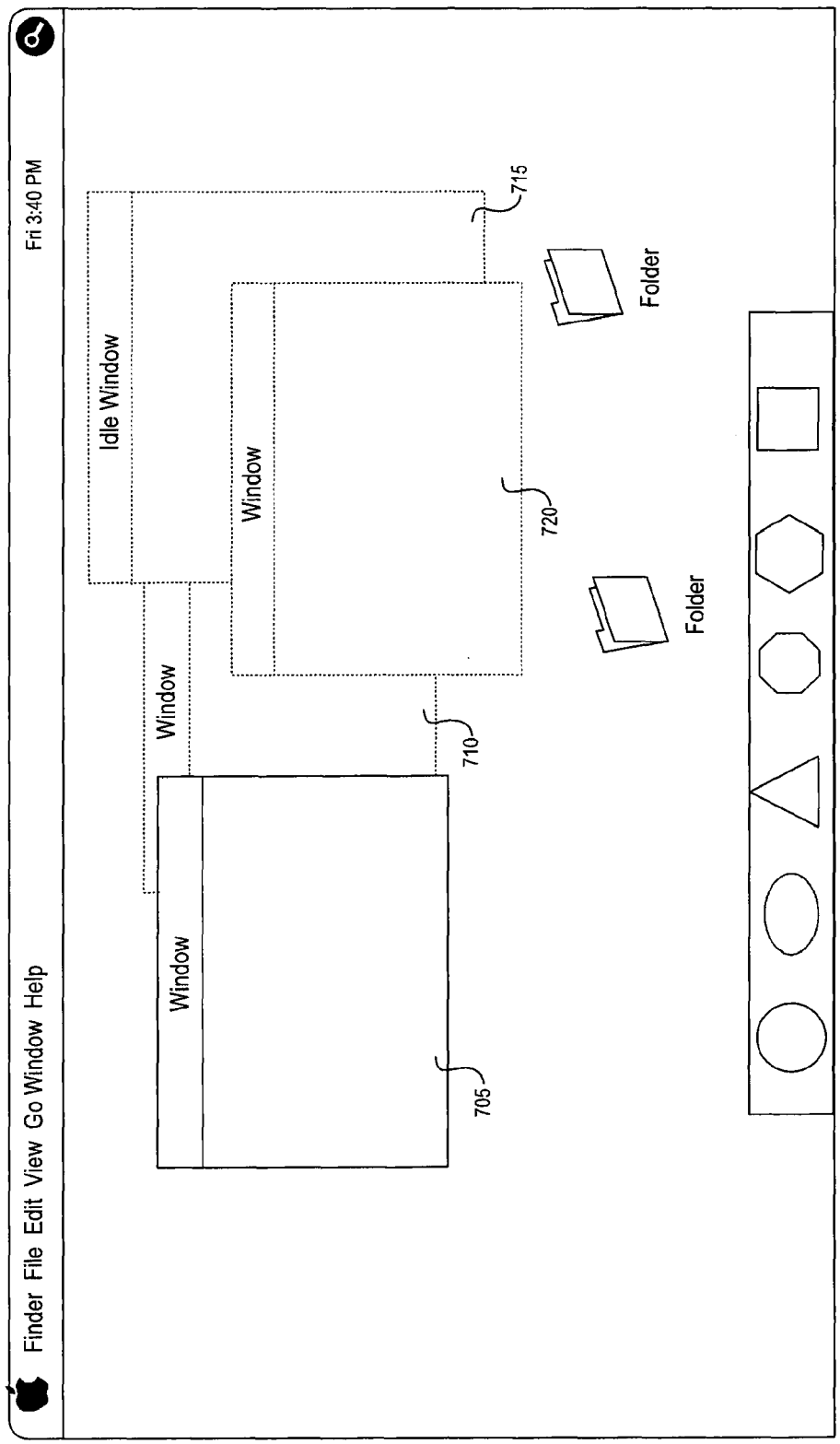
FIG. 7 is a block diagram of yet another example desktop environment.

According to still another implementation, a window may be automatically removed from the desktop environment if the window is overlapped by a minimum number of windows. FIG. 7 is a block diagram of another example desktop environment 700 which includes four windows 705, 710, 715, 720. As shown in FIG. 7, the first window 705 overlaps a second window 710. The second window 710 is also overlapped by third and fourth windows 715, 720, and the third window 715 is also overlapped by the fourth window 720.

According to an implementation, a window overlapped by a minimum number of other windows, i.e., a threshold number of windows, can be automatically removed from a desktop environment. For instance, two or more windows may be required to overlap a window before it is removed from a desktop environment. Applying this rule to the example desktop environment 700 shown in the FIG. 7, the second window 710 may be automatically removed from the desktop environment 700, while the third window 715 is not removed from the desktop environment 700. Windows may be removed from a desktop environment when overlapped by a minimum number of other windows regardless of the amount of time the windows remain inactive. However, according to one implementation, inactive windows will only be removed from a desktop environment if they are overlapped by minimum number of other windows and they remain inactive for a period of time.

According to yet another implementation, windows will only be removed from a desktop environment if they are overlapped by a minimum number of other windows, where the cumulative overlapping results in a substantial overlapping of a window. As an example, a window overlapped by two or more other windows may not be removed from a desktop environment if the two other windows only overlap a small total area of the window, for instance, approximately 5%, 10%, 20%, or the like.

According to yet another implementation, a window may be immediately removed from a desktop environment if the window is substantially overlapped by one or more other windows. Thus, the passage of a period of time is not required for a window to be removed from a desktop environment. Moreover, in another implementation, windows may be removed from a desktop environment (regardless of overlap from one or more other windows) if a number of windows exceeding a threshold number of windows are present and/or open in a desktop environment. Such a removal may or may not require the passing of a period of time before a window is removed.

According to an implementation, the conditions for removal of a window may vary based upon the type of window or windows displayed in a desktop environment. For instance, a window representing an application may be required to remain idle for a period of time longer than a window representing a notification (such as an error message) before it is removed from a desktop environment. One or more conditions for the removal of a window from a desktop environment may be associated with the type of system object associated with the window.

According to another implementation, each window may include a user-configurable setting to prevent the window from being removed regardless of the conditions for removal that it may be subject to and/or satisfy. According to an implementation, a window may be prevented from being removed based on its type and/or the content displayed in the window.

According to yet another implementation, if a symantic coverage feature is enabled for a window, which may be enabled by a user and/or automatically based on the window type and/or content displayed in the window, the window will not be removed if a major portion, such as a central portion, of the window is displayed. For instance, if several windows overlap edges of a window for which the symantic coverage feature is enabled, the window will not be removed regardless of the conditions for removal that it may be subject to and/or satisfy. The portion of the symantic window that must be overlapped before the window being removed may be set by a user, e.g., 25%. Additionally or alternatively, the content of the viewable window for which symantic coverage is enabled may dictate the overlap required before the window is subject to conditions for removal. As an example, a window for which symantic coverage is enabled that shows streaming stock quotes may not be removed where it is partially overlapped because the streaming stock quotes remain visible in the portion of the window that is not overlapped.

According to another implementation, the conditions for removal of a window may be based at least in part on metadata associated with the window. For instance, the window may include metadata identifying content of the window, which may dictate the period of time the window should remain open. Metadata within each window can also establish the conditions for removal of the window, including, for instance, the amount of time the window should remain open in the desktop environment. User preferences may also dictate the conditions for removal or windows, and may be set individually for each window, for types of system objects, and/or generally for all system objects.

One or more of the above-described conditions for removal of a window from a desktop environment described above may be used alone or in combination. After conditions are satisfied for the removal of an idle window, the window may be removed using one or more techniques.

Figure 8:
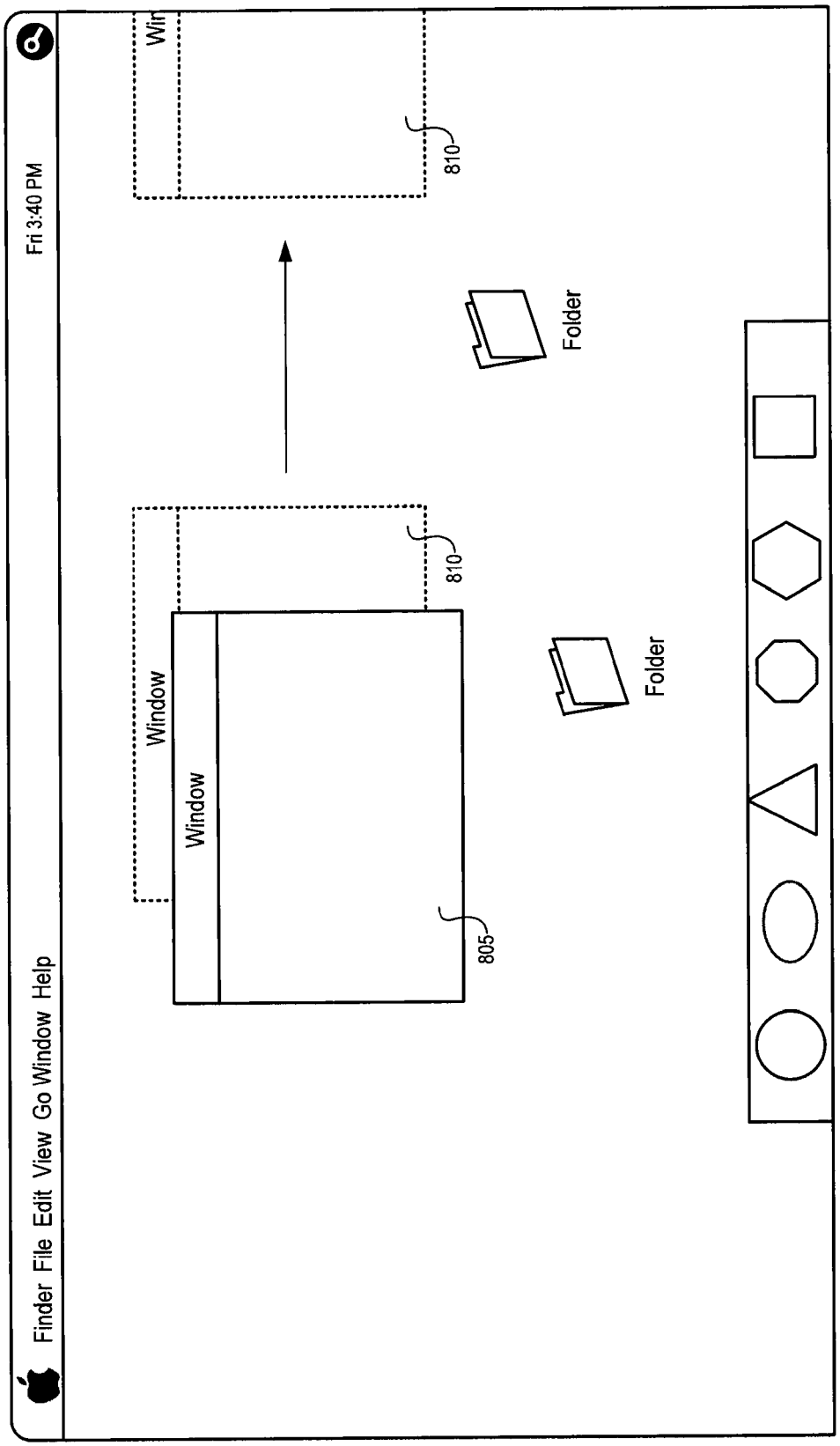
FIG. 8 is a block diagram of the example desktop environment of FIG. 6, illustrating window removal according to an implementation.

FIG. 8 is a block diagram of an example desktop environment 800 illustrating an implementation for the removal of a window 810 mat is overlapped by another window 805. The removal occurs once the window 810 satisfies the conditions for its removal. According to an implementation, the window 810 is removed from the desktop environment by being moved laterally off of the two dimensional viewing surface of the environment 800. According to another implementation, a window may be removed by moving the window off of the viewing surface by moving it vertically, or both vertically and laterally.

Figure 9:
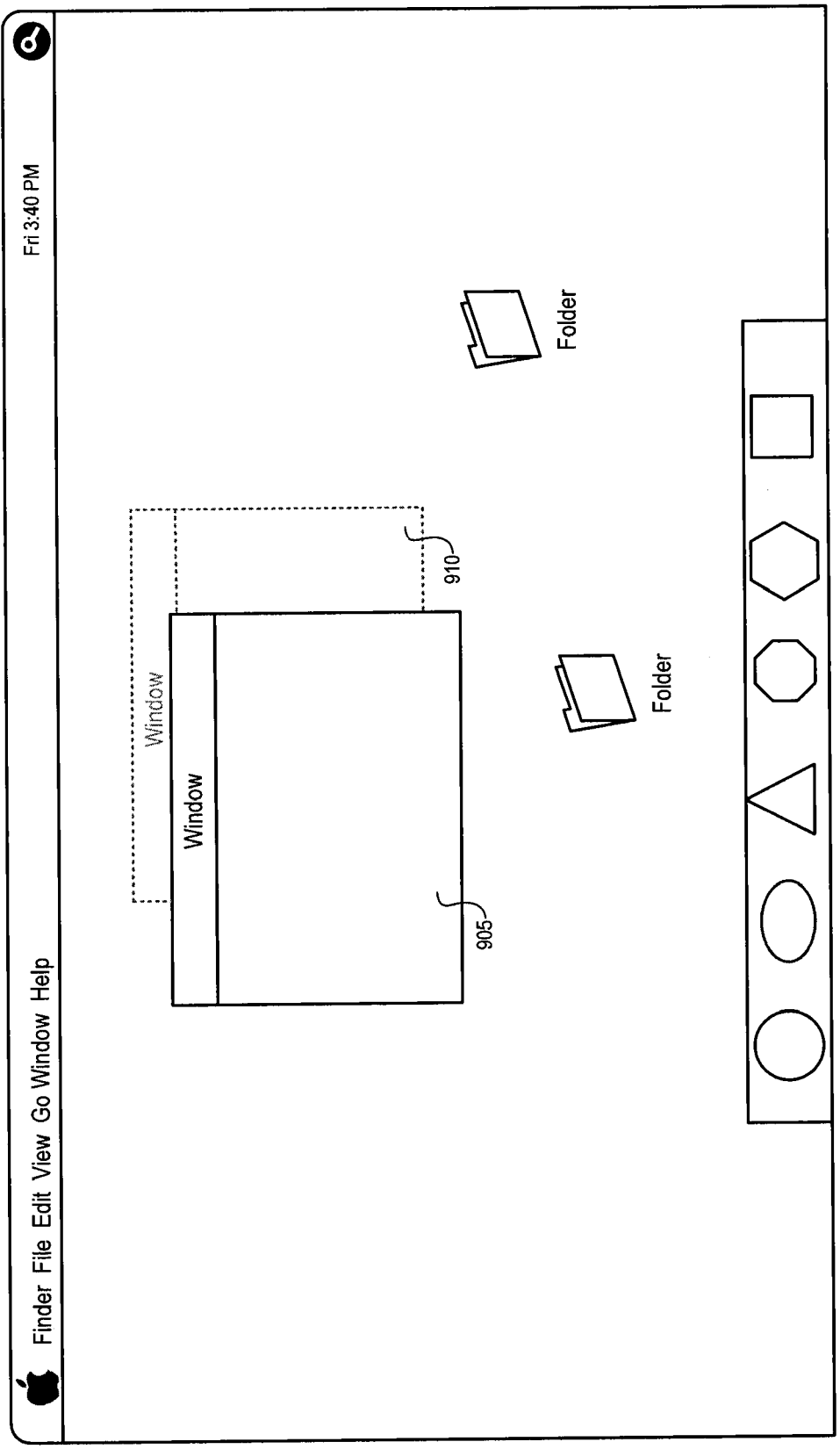
FIG. 9 is a block diagram of the example desktop environment of FIG. 6, illustrating window removal according to an implementation.

FIG. 9 is a block diagram of an example desktop environment 900 illustrating another implementation for the removal of a first window 910 that is overlapped by another window 905, after the first window satisfies conditions for its removal. According to the implementation shown in FIG. 9, the first window 910 gradually becomes transparent, i.e., fades away, until it is no longer displayed on the desktop environment 900. The first window 910 and its content may both slowly become transparent, or the content of the window may become transparent, after which the outline of the window Instantly disappears.

Figure 10:
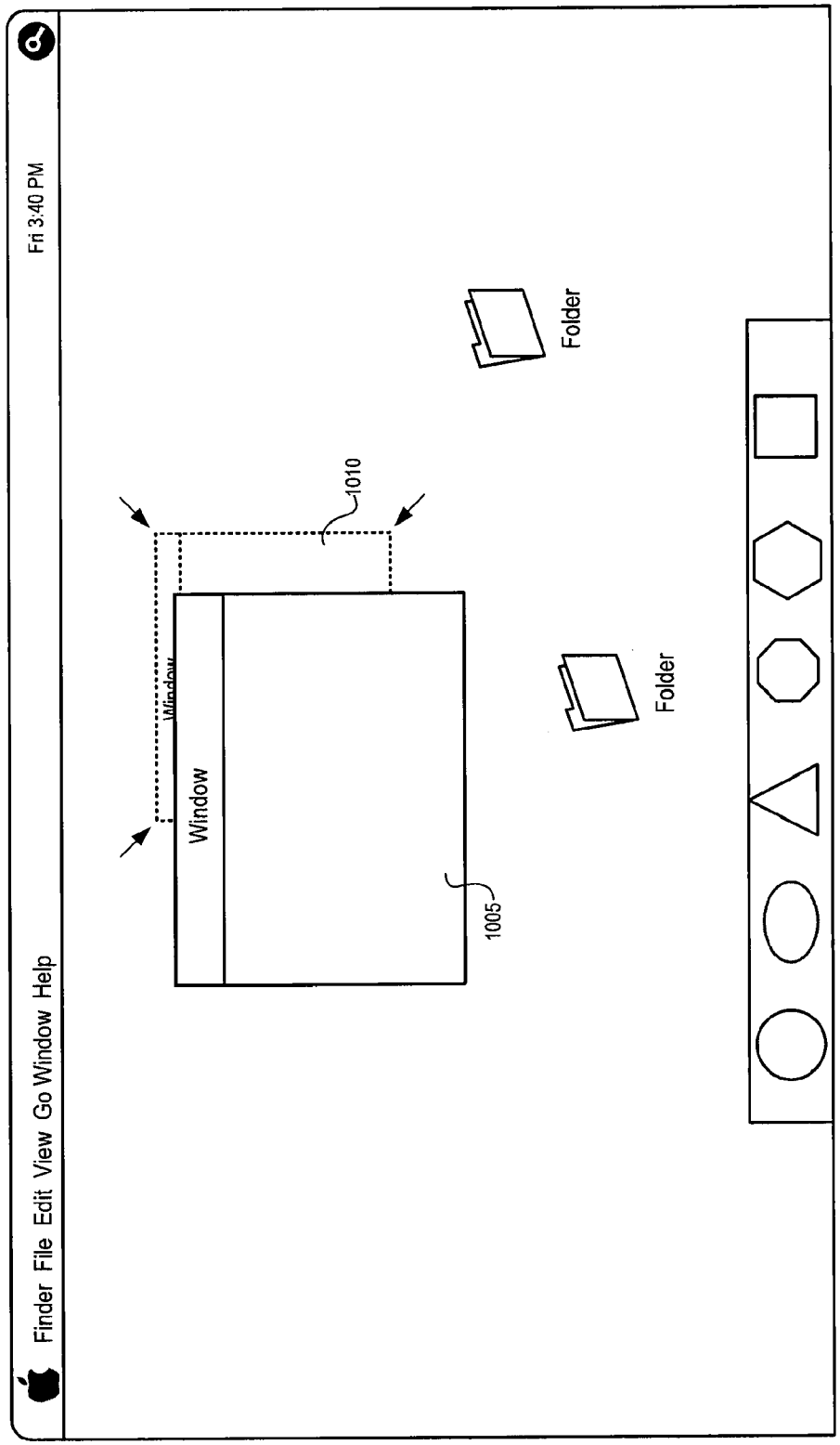
FIG. 10 is a block diagram of the example desktop environment of FIG. 6, illustrating window removal according to an implementation.

FIG. 10 is block diagram of an example desktop environment 1000 illustrating yet another implementation for the removal of a window 1010 that is overlapped by another window 1005. After the window 1010 satisfies conditions for its removal, the window 1010 is gradually scaled down in size until it is no longer displayed on the desktop environment 1000.

According to another implementation, a window may be instantly deleted, i.e., may instantly disappear from a desktop environment, after the conditions for its removal are satisfied. In another implementation, a window that is removed may be minimized and/or scaled down in size (e.g., to icon size), so that it does not entirely disappear from a desktop environment. The window may also join a stack of system objects upon being minimized or reduced in size. In other implementations, windows may be removed to a desk drawer. According to yet another implementation, windows can cross-fade through each other. Any combination of window removal techniques described above may also be used to remove a window from a desktop environment. Additionally, according to an implementation, multiple windows may be removed simultaneously.

According to an implementation, windows that have been removed from a desktop environment, or minimized, may automatically reappear.

According to an implementation, windows can have contextual relationships with other windows and/or other system objects in a desktop environment. For instance, software applications may be related, either by a user or by the system. As another example, documents may be related by context or subject matter regardless of the applications with which they are associated. The relationships may exist automatically due to their origin, content, creation, name, or the like. For instance, multiple documents that exist as attachments to a single email may be related, or objects stored within a particular folder may be related. As another example, objects generated by a particular user using a specific application may be related. According to another implementation, the relationships may be established by a user.

According to an implementation, selection of a system object, such as a window, can cause related system objects to return to a desktop environment. As an example, use of a previously inactive window on a desktop environment may cause related windows to automatically reappear. The reappearance of windows can appear in the reverse manner of their removal described above.

Figure 11:
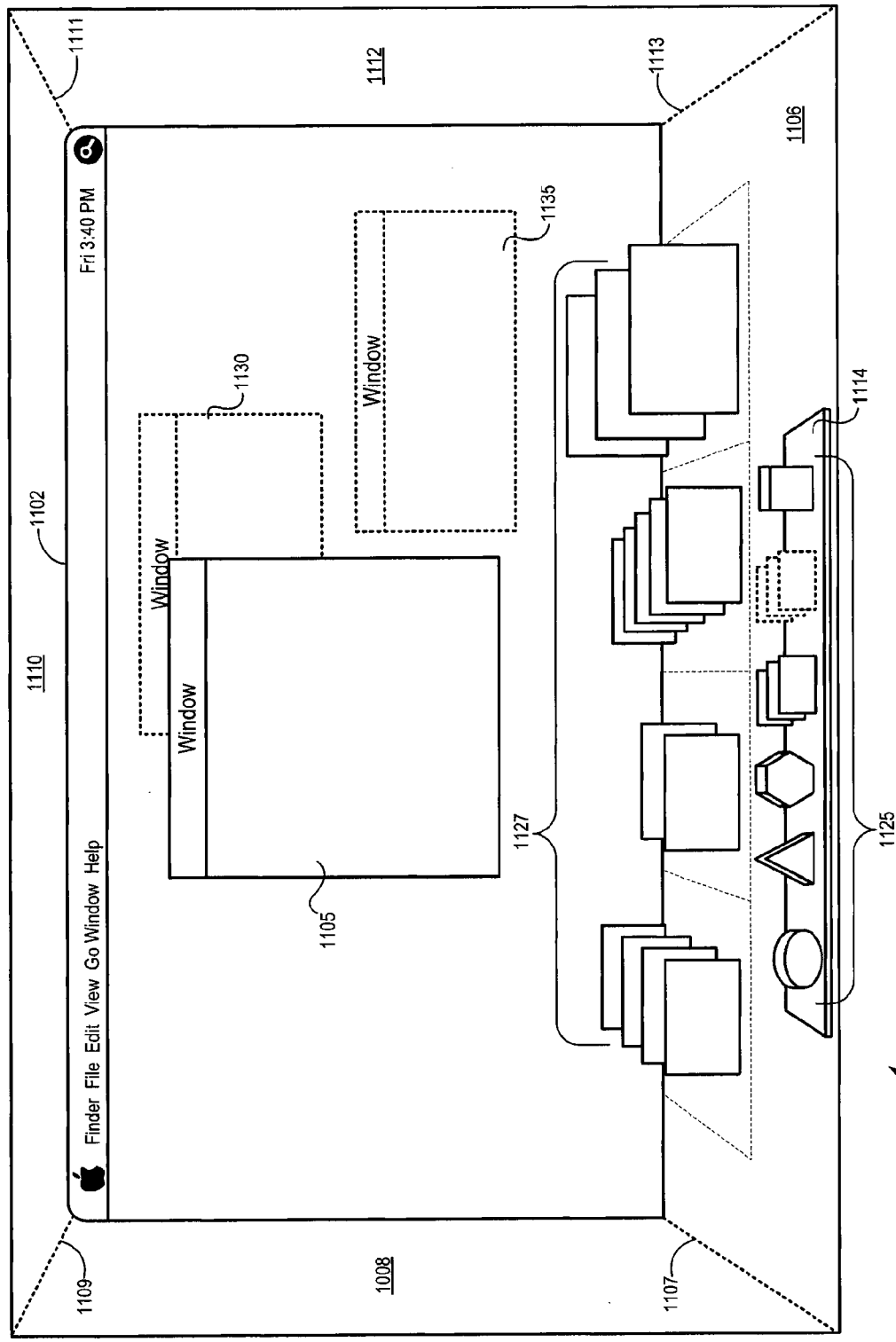
FIG. 11 is block diagram of an example multidimensional desktop environment.

FIG. 11 is block diagram of an example multidimensional desktop environment 1100. In the example implementation, the multidimensional desktop environment 1100 includes a back surface 1102 that is axially disposed, e.g., along the z-axis, from a viewing surface 1104. In one implementation, the viewing surface can be defined by the entire image on a display device, e.g., a "front pane." One or more side surfaces, such as side surfaces 1106, 1108, 1110 and 1112, are extended from the back surface to the viewing surface. A visualization object receptacle 1114 is generated on one or more of the side surfaces, such as side surface 1106. In an implementation, the side surfaces 1106, 1108, 1110 and 1112 can intersect at intersections 1107, 1109, 1111 and 1113, respectively. Although four side surfaces are shown in FIG. 11, fewer side surfaces can be defined; for example, in an implementation, only side surfaces 1106, 1108 and 1112 are defined, and there is an absence of a "top" side surface 1110.

The visualization object receptacle 1114 can include a plurality of visualization objects 1125. The visualization objects 1125 can, for example, include graphical representations corresponding to one or more system objects, such as applications, documents, and functions. Additionally, one or more system objects, e.g., stack items, visualization objects, and the like 1127, can be disposed on one or more of the side surfaces 1108, 1110 and 1112.

The multidimensional desktop environment 1100 includes a first window 1105 that overlaps a second window 1130, and also includes a third window 1135. Each of the conditions described herein for automatic removal of a window in a two dimensional environment also apply to a multidimensional desktop environment. As examples, the second window 1130 may be removed from the multidimensional desktop environment 1100 after it remains in an inactive state for a period of time, is overlapped by a predetermined number of other windows, has a substantial amount of its service area covered by one or more other windows, and/or when a number of other windows are open, in the environment.

According to another implementation, different conditions for removal of windows may also be established for each surface of the multidimensional desktop environment. For instance, a first set of conditions may be required to be satisfied for removal of windows from one or more of the side surfaces 1106, 1108, 1110 and 1112, and a second set of conditions may be required to be satisfied for the removal of windows from a different surface, such as the viewing surface 1104 or the back surface 1102.

Each of the techniques described for automatic removal of a window in a two dimensional environment also apply to a multidimensional desktop environment 1100. For instance, a window satisfying conditions for removal may be moved laterally or horizontally from a surface of the multidimensional desktop environment 1100, may gradually become transparent, may instantly be deleted, and/or may be scaled down in size until it is no longer displayed in the multidimensional desktop environment 1100. However, in a multidimensional desktop environment, such as the example multidimensional desktop environment 1100 of FIG. 11, the movement of a window may also pass over or between more than one surface before being totally removed from view. For instance, a window may move from the back surface 1102 to one or more side surfaces 1106, 1108, 1110 and 1112 before being removed completely from the multidimensional desktop environment 1100. According to another example, a window positioned on the viewing surface 1104 may move backward towards the back surface 1102 as the window is scaled down in size.

Figure 12:
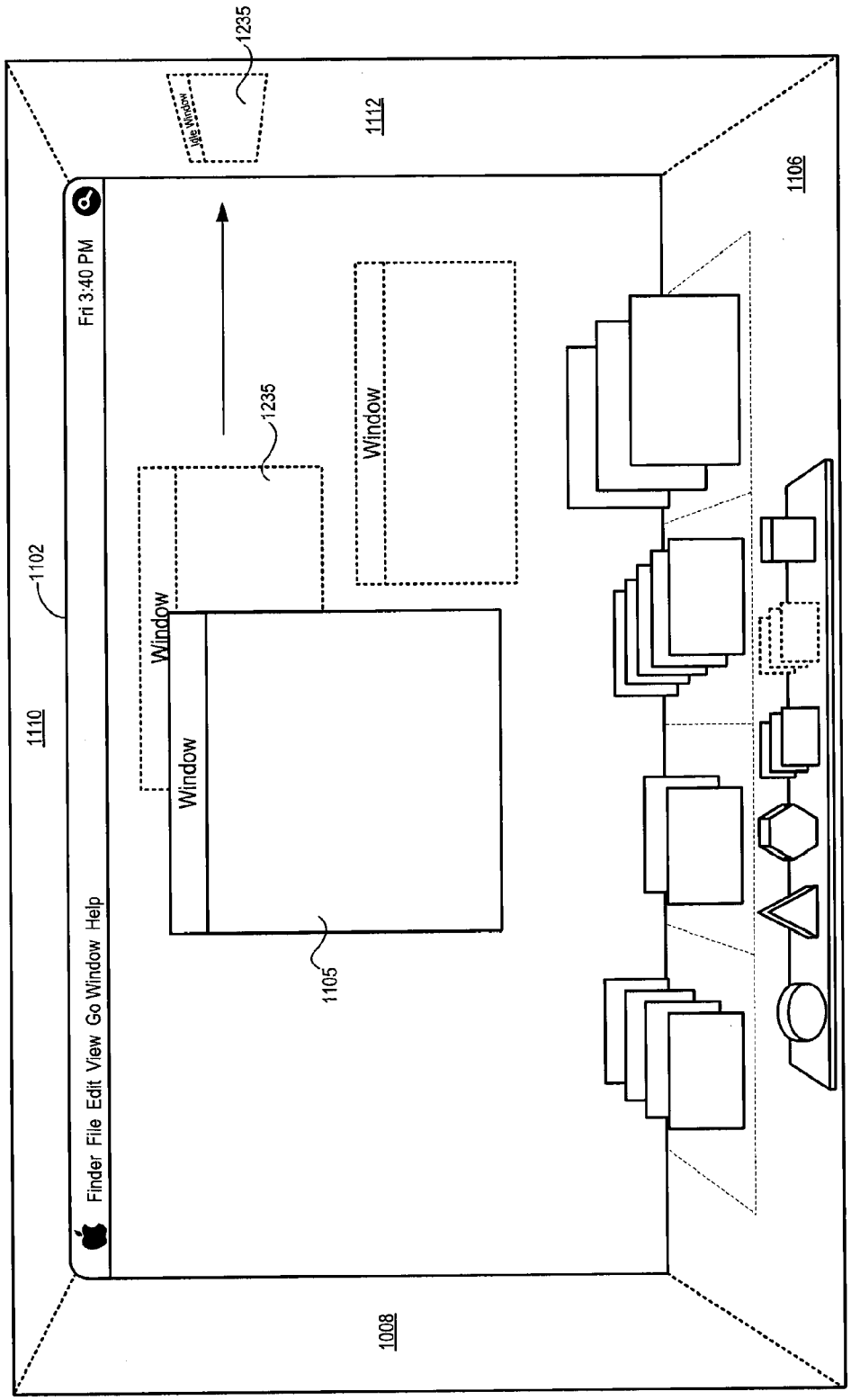
FIG. 12 is a block diagram of the example multidimensional desktop environment of FIG. 11, illustrating window removal according to an implementation.

FIG. 12 is a block diagram of an example multidimensional desktop environment 1200 illustrating another implementation for the removal of a window 1235. Once the conditions are satisfied for the removal of the window 1235, the window 1235 may be removed from a first location in a multidimensional desktop environment to another location in the multidimensional desktop environment. As a result, removal of a window does not require that the window be removed completely from a multidimensional, desktop environment. For instance, as is shown in FIG. 12, the window 1235 on the back surface 1102 that satisfies the one or more conditions for its removal may be scaled down and moved to one of the side surfaces 1106, 1108, 1110 and 1112 of the multidimensional desktop environment 1200, such as a side surface 1112. This permits a user to re-select the window 1235, for instance, using a mouse. This technique may also apply to two dimensional surfaces, where idle windows are scaled down in size and placed in a location on a desktop environment.

As described herein, because different conditions may exist for the removal of windows from each surface of a multidimensional desktop environment, a window may first be moved from a first surface to a second surface, and then subsequently be removed from the second surface. For instance, after being removed from the back surface 1102 and moved to the side surface 1112, the window 1235 may be removed from the side surface 1112. Thus, the window may be deleted from the side surface 1112 after the passage of a period of time the window 1235 is inactive on the side surface 1112.

Figure 13:
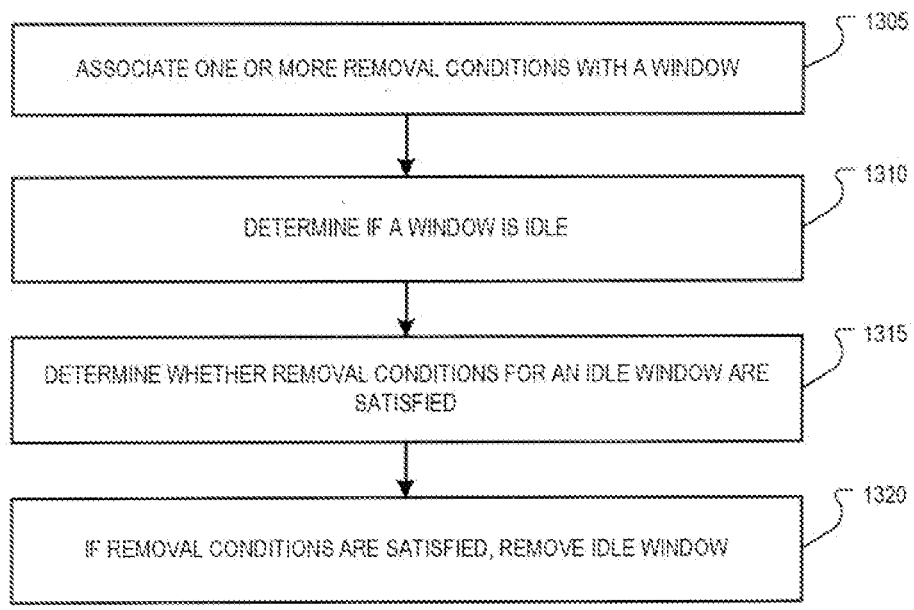
FIG. 13 is a flow diagram of an example process for automatically removing a window from a desktop environment.

FIG. 13 is a flow diagram of an example process for automatically removing a window from a desktop environment, where the desktop environment includes a graphical user interface, according to an implementation. First, a graphical user interface including at least a first window is generated (block 1305). Thereafter, the first window is removed from, the graphical user interface if the first window remains inactive for a period of time, and the first window is overlapped by at least one other window (block 1310).

Figure 14:
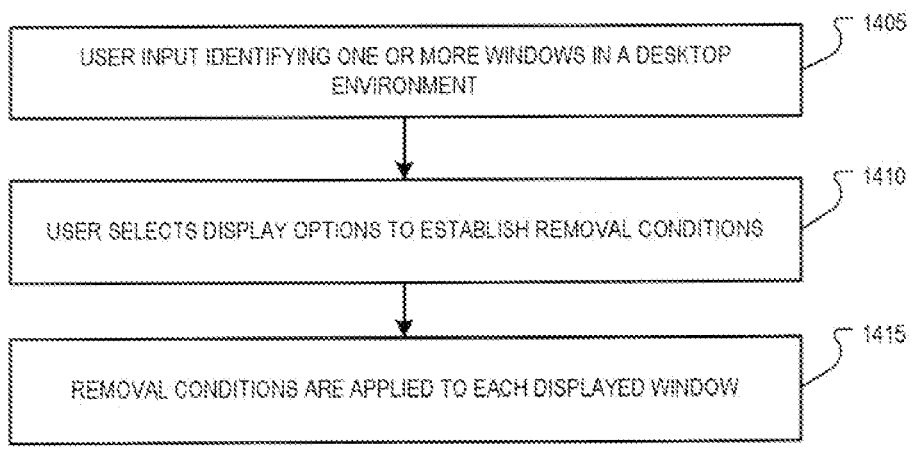
FIG. 14 is a flow diagram, of another example process for automatically removing a window from a desktop environment.

FIG. 14 is a flow diagram of another example process for automatically removing a window from a desktop environment, where the desktop environment includes a graphical user interface, according to an implementation. First, a graphical user interface including at least a first window is generated (block 1405). Thereafter, the first window is removed from the graphical user interface if the first window remains inactive for a period of time, and the first window is substantially overlapped by at least one other window (block 1410).

Figure 15:
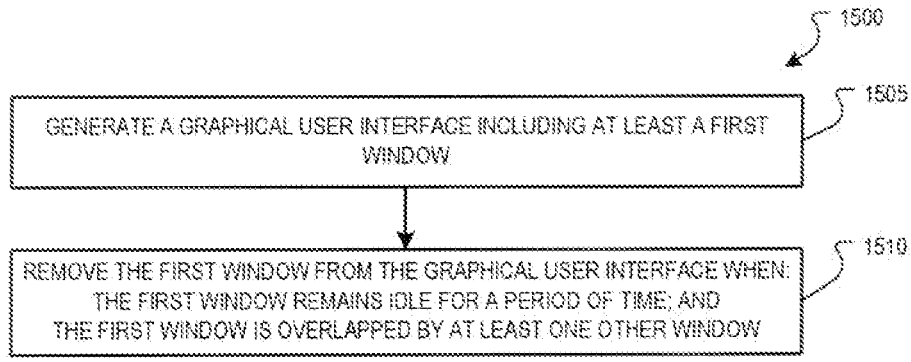
FIG. 15 is a flow diagram of another example process for automatically removing a window from a desktop environment.

FIG. 15 is a flow diagram of yet another example process for automatically removing a window from a desktop environment, where the desktop environment includes a graphical user interface, according to an implementation. First, a graphical user interface including at least a first window is generated (block 1505). Thereafter, the first window is removed from the graphical user interface if the first window remains inactive for a period of time, and a number of other windows exceeding a threshold limit are displayed on the graphical user interface (block 1510).

Figure 16:
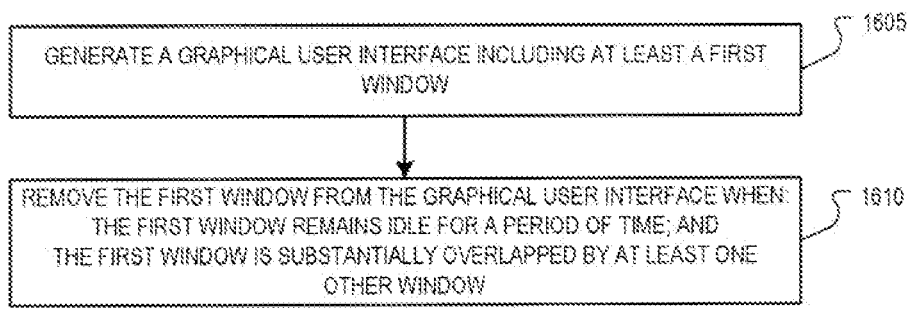
FIG. 16 is a flow diagram of another example process for automatically removing a window from a desktop environment.

FIG. 16 is a flow diagram of another example process for moving a window from a first surface of a desktop environment to a second surface of the desktop environment, where the desktop environment includes a multi-dimensional graphical user interface. First, a multi-dimensional graphical user interface including at least a first window is generated (block 1605). Thereafter, the first window is removed from a first surface of the multi-dimensional graphical user interface and moved to a second surface of the multi-dimensional graphical user interface if the first window remains inactive for a period of time, and the first window is substantially overlapped by at least one other window (block 1610).

Figure 17:
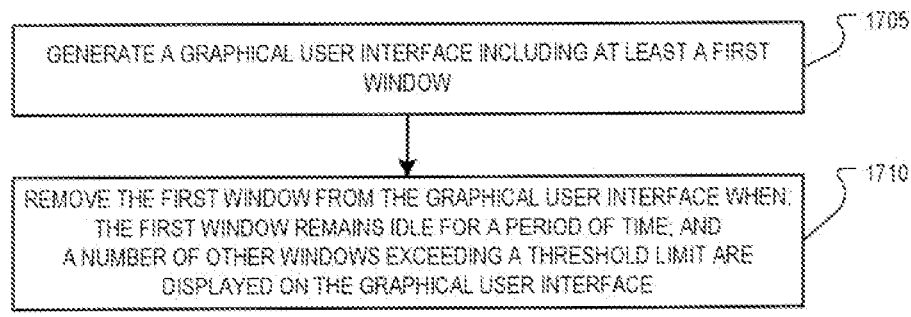
FIG. 17 is a flow diagram of another example process for automatically removing a window from a desktop environment.

FIG. 17 is a flow diagram of yet another example process for automatically removing a window from a desktop environment, where the desktop environment includes a graphical user interface, according to an implementation. First, a graphical user interface including at least a first window is generated (block 1705). Thereafter, the first window is removed from the graphical user interface if a total number of windows displayed on the graphical user interface exceeds a threshold limit (block 1710).

Figure 18:
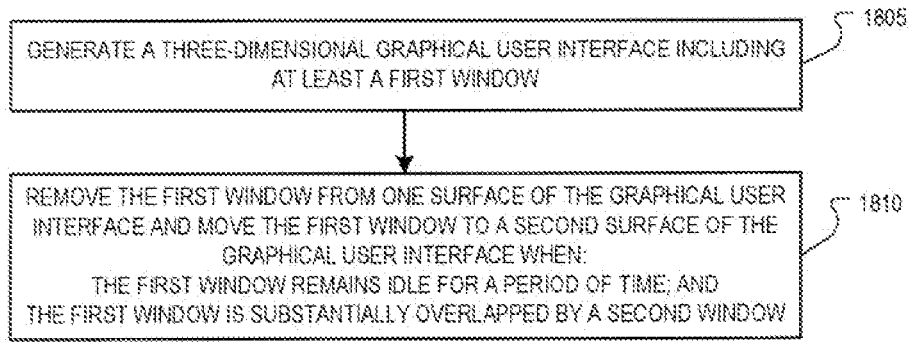
FIG. 18 is a flow diagram, of another example process for automatically removing a window from a desktop environment.

FIG. 18 is a flow diagram of still another example process for automatically removing a window from a desktop environment, where the desktop environment includes a graphical user interface, according to an implementation. First, a graphical user interface including at least a first window is generated (block 1805). Thereafter, the first window is removed from the graphical user interface if a total number of windows overlapping the first window exceeds a threshold limit (block 1810).

Figure 19:
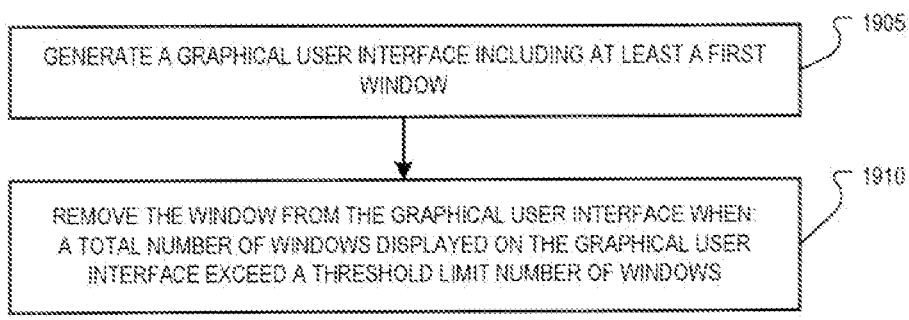
FIG. 19 is a flow diagram of another example process for automatically removing a window from a desktop environment.

FIG. 19 is a flow diagram of another example process for automatically removing a window from a desktop environment, where the desktop environment includes a graphical user interface, according to an implementation. First, a graphical user interface including at least a first window is generated (block 1905). Thereafter, the first window is removed from the graphical user interface if a total number of windows displayed on the graphical user interface exceed a threshold limit (block 1910).

Figure 20:
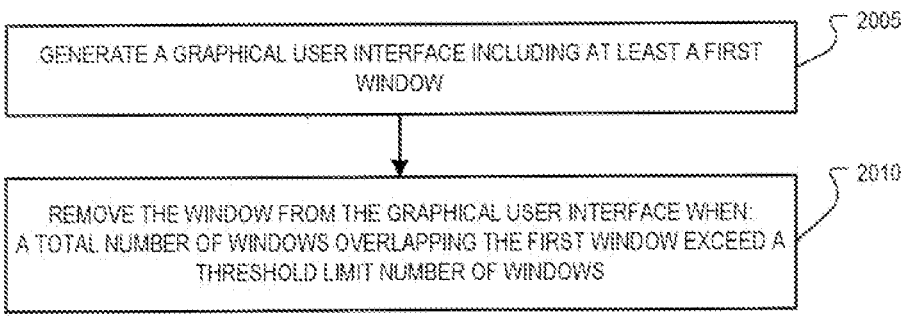
FIG. 20 is a flow diagram of another example process for automatically removing a window from a desktop environment.

FIG. 20 is a flow diagram of another example process for automatically removing a window from a desktop environment, where the desktop environment includes a graphical user interface, according to an implementation. First, a graphical user interface including at least a first window is generated (block 2005). Thereafter, the first window is removed from the graphical user interface if a total number of windows overlapping the first window exceed a threshold limit (block 2010).

The apparatus, methods, flow diagrams, and structure block diagrams described in this patent document may be implemented in computer processing systems including program code comprising program instructions that are executable by the computer processing system. Other implementations may also be used. Additionally, the flow diagrams and structure block diagrams described in this patent document, which describe particular methods and/or corresponding acts in support of steps and corresponding functions in support of disclosed structural means, may also be utilized to implement corresponding software structures and algorithms, and equivalents thereof.

What is claimed is:

1. A computer readable medium storing instructions that are executable by a processing device, and upon such execution cause the processing device to perform operations comprising:

providing a first graphical object and a second graphical object for display in a graphical user interface;

determining that a threshold area of the first graphical object is overlapped by the second graphical object for a threshold period of time; and then removing the first graphical object from the graphical user interface, including providing the first graphical object for display gradually more transparently in a fading manner until the first graphical object is no longer displayed in the graphical user interface.

2. The computer readable medium of claim 1, the operations comprising scaling the first graphical object down in size.

3. The computer readable medium of claim 1, the operations comprising moving the first graphical object laterally or vertically off of the graphical user interface.

4. The computer readable medium of claim 1, wherein:

the first graphical object comprises a window having window content and a window outline, and providing the first graphical object for display gradually more transparently comprises:

displaying the window content of the first graphical object gradually more transparently in a fading manner; and when the window content becomes transparent, instantly ceasing to display the window outline.

5. The computer readable medium of claim 1, wherein:

the first graphical object has a contextual relationship with the second graphical object, the contextual relationship being determined based on at least one of an origin, content, creation, or a name, the origin, content, creation, and name relating the first graphical object to the second graphical object, and the operations comprise:

receiving an input indicating that the second graphical object is used; and in response to receiving the input, causing, based on the contextual relationship between the first graphical object and the second graphical object, the first graphical object to reappear in the user interface.

6. The computer readable medium of claim 1, wherein the threshold area is approximately 50% of the first graphical object's area.

7. The computer readable medium of claim 1, wherein the first graphical object represents a first document, the second graphical object represents a second document, wherein both the first document and the second document are associated with an email application by virtue of being attached to a same email message.

8. The computer readable medium of claim 1, wherein the second graphical object is a window that is inactive prior to a selection of using the second graphical object.

9. A computer-implemented method, comprising:

providing a first graphical object and a second graphical object for display in a graphical user interface determining that a threshold area of the first graphical object is overlapped by the second graphical object for a threshold period of time and then removing the first graphical object from the graphical user interface, including providing the first graphical object for display gradually more transparently in a fading manner until the first graphical object is no longer displayed in the graphical user interface.

10. The computer-implemented method of claim 9, comprising scaling the first graphical object down in size until the first graphical object ceases to be displayed.

11. The computer-implemented method of claim 9, comprising moving the first graphical object laterally or vertically off of the graphical user interface.

12. The computer-implemented method of claim 9 wherein:
the first graphical object comprises a window having window content and a window outline, and
providing the first graphical object for display gradually comprises:
displaying the window content of the first graphical object gradually more transparently in a fading manner; and
when the window content becomes transparent, instantly ceasing to display the window outline.

13. The computer-implemented method of claim 9, wherein:
the first graphical object has a contextual relationship with the second graphical object, the contextual relationship being determined based on at least one of an origin, content, creation, or a name, the origin, content, creating, and name relating the first graphical object to the second graphical object, and
the method comprises:
receiving an input indicating that the second graphical object is used; and
in response to receiving the input, causing, based on the contextual relationship between the first graphical object and the second graphical object, the first graphical object to reappear in the user interface.

14. The computer-implemented method of claim 9, wherein the threshold area is approximately 50% of the first graphical object's area.

15. The computer-implemented method of claim 9, wherein the first graphical object represents a first document, the second graphical object represents a second document, wherein both the first document and the second document are associated with an email application by virtue of being attached to a same email message.

16. The computer-implemented method of claim 9, wherein the first graphical object is a window, and the second graphical object is a window that is different from the window of the first graphical object.

17. A system, comprising:
one or more data processing devices configured to perform operations comprising:
providing a first graphical object and one or more second graphical objects for display in a graphical user interface;
determining that a number of second graphical objects overlapping the first graphical object exceeds a threshold limit number; and then
removing the first graphical object from the graphical user interface, including providing the first graphical object for display gradually more transparently in a fading manner until the first graphical object is no longer displayed in the graphical user interface.

18. The system of claim 17, wherein the threshold limit number is configurable by a user.

19. The system of claim 17, the operations comprising:
receiving an input indicating that a second graphical object is being used; and
in response to receiving the input, causing, based on a contextual relationship between the first graphical object and the second graphical object, the first graphical object to reappear in the graphical user interface.

20. The system of claim 19, wherein:
the first graphical object is a window representing a first document; and
the second graphical object is a window representing a second document, the first document and the second document being related by a subject matter included in both the first document and the second document.

\* \* \* \* \*